(12) United States Patent
Takeuchi et al.

(10) Patent No.: US 7,433,767 B2
(45) Date of Patent: Oct. 7, 2008

(54) STEERING CONTROL DEVICE AND STEERING CONTROL METHOD OF MOTOR VEHICLE

(75) Inventors: Shinji Takeuchi, Okazaki (JP); Jiro Nakano, Okazaki (JP); Kenichi Fukumura, Nukata-gun (JP); Yutaka Mori, Toyohashi-shi (JP)

(73) Assignee: JTEKT Corporation, Osaka (JP)

( * ) Notice: Subject to any disclaimer, the term of this patent is extended or adjusted under 35 U.S.C. 154(b) by 738 days.

(21) Appl. No.: 10/513,924

(22) PCT Filed: Jun. 12, 2003

(86) PCT No.: PCT/JP03/07453

§ 371 (c)(1),
(2), (4) Date: Nov. 10, 2004

(87) PCT Pub. No.: WO03/106244

PCT Pub. Date: Dec. 24, 2003

(65) Prior Publication Data

US 2005/0159866 A1    Jul. 21, 2005

(30) Foreign Application Priority Data

Jun. 12, 2002    (JP) .............................. 2002-170819

(51) Int. Cl.
*B62D 6/00* (2006.01)
*H02P 7/74* (2006.01)
*G06F 19/00* (2006.01)

(52) U.S. Cl. .............................. 701/41; 701/29; 701/35; 180/443

(58) Field of Classification Search .................... 701/41, 701/42, 43, 29, 30, 35; 180/411, 443; 318/34
See application file for complete search history.

(56) References Cited

U.S. PATENT DOCUMENTS

| 5,747,950 | A |   | 5/1998  | Friedrichsen et al. |
|-----------|---|---|---------|---------------------|
| 5,828,972 | A | * | 10/1998 | Asanuma et al. ............... 701/41 |
| 6,208,923 | B1| * | 3/2001  | Hommel ...................... 701/42 |
| 6,394,218 | B1|   | 5/2002  | Heitzer |
| 6,548,969 | B2| * | 4/2003  | Ewbank et al. ................ 318/34 |
| 6,687,590 | B2| * | 2/2004  | Kifuku et al. .................. 701/43 |

(Continued)

FOREIGN PATENT DOCUMENTS

DE    198 34 870    2/2000

(Continued)

*Primary Examiner*—Tan Q Nguyen
(74) *Attorney, Agent, or Firm*—Oblon, Spivak, McClelland, Maier & Neustadt, P.C.

(57) ABSTRACT

A first system and a second system include a first motor and a second motor for driving a steering mechanism in dependence on the rotational manipulation of a steering wheel. A first ECU and a second ECU mutually monitor abnormalities of the systems each to stop an abnormal system. When the respective systems are normal, the first ECU and the second ECU drivingly control the first motor and the second motor of their own systems to drive the steering mechanism by cooperation of the respective motors. When either one of the both systems is abnormal, the ECU of the other system solely drivingly controls the motor of its own system thereby to drive the steering mechanism. Thus, it can be realized to make the systems low in cost irrespective of the provision of the plural systems.

17 Claims, 5 Drawing Sheets

U.S. PATENT DOCUMENTS

6,945,350 B2 * 9/2005 Szabela et al. ............ 180/411

FOREIGN PATENT DOCUMENTS

| JP | 10-218000 | 8/1998 |
| JP | 2000-53015 | 2/2000 |
| JP | 2001-354154 | 12/2001 |
| JP | 2002-37112 | 2/2002 |
| WO | WO 01/72571 A2 | 10/2001 |

* cited by examiner

STEERING CONTROL DEVICE AND STEERING CONTROL METHOD OF MOTOR VEHICLE

TECHNOLOGICAL FIELD

The present invention relates to a vehicle steering control device and a vehicle steering control method used in a steering control device of the steer-by-wire type or an electric power steering control device.

BACKGROUND ART

As devices for controlling steerable wheels for vehicles, there has heretofore been known a steering control device of the steer-by-wire type that a steering wheel is mechanically disconnected from a steering gear box which is in linkage to front wheels (steerable wheels). In the steering control device, the steering wheel is not mechanically connected to the steering gear box, and the steering angle of the steering wheel is detected so that the steering gear box is driven by an electric motor in dependence on the detected steering angle.

In the steering control device of this kind, a fail-safe capability of a certain type is provided so that the steering operation is enabled to be continued reliably in the event of a failure of the device. As one for performing the fail-safe capability, there has been proposed a construction having two duplex systems, as described in Japanese unexamined, published patent application No. 2002-37112.

One of the two systems operates as a main system, which is provided with one motor for driving a shaft coupled to steerable wheels, one drive circuit for driving the motor, one control circuit for controlling the motor through the drive circuit and various sensors necessary for the control. The other system operates as a secondary system, which is provided with the same construction as the main system.

In the device with the two systems, in the normal state, the respective motors are operated not to interfere with each other, and the motor for the main system operates to drive the shaft in dependence on the steering angle of the steering wheel. That is, although the two motors of the both systems are operated simultaneously, they do not cooperate to drive the shaft coupled to the steerable wheels. Further, when the main system falls in failure for some causes, the motor for the main system is made to stop, and the motor for the remaining secondary system is brought into operation to drive the shaft.

However, in the foregoing device, the motor for the main system which actually drives the shaft in the normal state and the other motor for the secondary system which does not actually drive the shaft in the normal state are designed to be of the same specification which has such a large output that is capable of driving the shaft singly in dependence on the steering angle even when the reaction force from the road surface is large. This gives rise to a problem that it is unable to reduce the cost for the motors, which causes the steering control device to be of a high cost.

Further, it may be attempted that in a different way from the technology proposed in the Japanese unexamined, published patent application No. 2002-37112, the motor for the secondary system is made to remain stopped and the switching is made to the secondary system in the event that the main system falls in failure. However, even if such an attempt were made, the difficulty in the cost reduction of the motors would remain so far as the both motors are same in the specification of their power outputs. Furthermore, as far as such plural (two or more) duplex systems are provided wherein motors for the respective systems are same in the power output specification, the similar problem in reducing the cost of the motors arises not only in the steering control device of the steer-by-wire type.

It is an object of the present invention to provide a vehicle steering control device and a vehicle steering control method which are capable of reducing the system cost irrespective of the provision of plural systems.

DISCLOSURE OF THE INVENTION

In a first aspect, the present invention resides in a vehicle steering control device having plural systems each including an electric motor for driving a steering mechanism for steerable wheels in dependence on the rotational manipulation of a steering handle, each of the systems being provided with the electric motor, drive means for driving the electric motor and control means for controlling the drive means in dependence on the rotational manipulation of the steering handle. The control means of the respective systems include abnormality monitor means for mutually monitoring abnormality of the systems to stop an abnormal system. When the respective systems are normal, the control means of the respective systems drivingly control the electric motors of their own systems through the respective drive means to drive the steering mechanism by the cooperation of the respective electric motors. When at least one system is abnormal, the control means of other systems drivingly control the electric motors of their own systems through their own drive means to drive the steering mechanism by the cooperation of the respective motors, or when at least one system is abnormal, the control means of the remaining system solely drivingly controls the electric motor of its own system through the drive means of its own system to drive the steering mechanism.

According to the present invention, it can be realized to drive the steering mechanism by the cooperation of the motors of the respective systems when the respective systems are normal. As a result, it can be realized to make the output torque of each motor smaller than that in the prior art, so that the output specification of the motors can be lowered to reduce the cost therefor. This leads to reducing the cost for the steering control device provided with the respective systems.

In the device provided with two systems described in the Japanese unexamined, published patent application No. 2002-37112, the respective systems in the normal state drivingly control respective motors at the same time so that they do not interfere with each other. In this technology, however, there is taken a construction that while the respective motors of the respective systems are simultaneously driven in the normal state, the control of steerable wheels are, in fact, performed by the motor of one system only. Thus, there arises a problem that an electric power is uselessly consumed for driving the motor of the other system which actually does not drive the shaft in the normal state. In the present invention, on the contrary, since there is taken a construction that the respective systems drive the shaft together in the normal state, the useless consumption of the electric power does not take place as described above.

In a second aspect, the present invention resides in the vehicle steering control device in the aforementioned first aspect, wherein the electric motors of the respective systems are provided with a rotor common thereto, and wherein a stator for the electric motors of the plural systems is arranged around the rotor.

According to the present invention, since the rotor which is a component to be used for each motor is provided to be common to (commonly used for) the respective motors, the number of the components is reduced to lower the cost therefor. Further, the motor shaft as rotor is provided to be common, the present invention can be downsized and lightened in weight compared with the case that individual rotors are provided for the electric motors of the respective systems.

Further, in a third aspect, the present invention resides in the vehicle steering control device in the aforementioned second aspect, wherein the stator is provided with a plurality of poles common to the motors, and wherein windings of the electric motors for the different systems are respectively wound around the common poles.

According to the present invention, the poles of the stator are made to be common (i.e., commonly used), the respective motors do not need their own stators. That is, the number of components for stators can be decreased, and the cost can be lowered. Further, the stator is made to be common (commonly used), the present invention can be downsized and lightened in weight compared with the case that individual stators are provided for the electric motors of the respective systems.

In a fourth aspect, the present invention resides in the vehicle steering control device in the aforementioned third aspect, wherein the windings of the electric motors for the different systems arranged on each of the common poles are respectively wound to become the same phase. Therefore, the respective motors can easily cooperate to drive the steering mechanism.

In a fifth aspect, the present invention resides in the vehicle steering control device in any one of the aforementioned first to fourth aspects, wherein each of the control means including the abnormality monitor means is provided with dynamic braking prevention means for preventing the electric motor of an abnormal system from generating dynamic braking when the abnormality monitor means stops the abnormal system.

According to the present invention, it can be realized to prevent the motor of the abnormal system from generating the dynamic braking. Therefore, it does not occur that the motor of the abnormal system, when stopped, weakens the propelling force (output torque) of the motor in each normal system.

In a sixth aspect, the present invention resides in the vehicle steering control device in the aforementioned fifth aspect, wherein each of the electric motors is provided with a phase opening relay for the prevention of the dynamic braking, and wherein the dynamic braking prevention means brings the phase opening relay of the electric motor for the abnormal system into OFF state when the abnormality monitor means stops the abnormal system. Therefore, the same advantages as those in the fifth aspect can be easily realized by a simplified construction.

In a seventh aspect, the present invention resides in the vehicle steering control device in the aforementioned first aspect, wherein the control means of the respective systems perform the control operations so that the electric motors of the respective systems output the same outputs as each other when the respective systems are normal.

According to the present invention, the output torque generated by the motors of the plural systems in the normal state becomes the total sum of the same outputs generated by the respective motors, and in the normal state, there can be obtained a propelling force which drives the steering mechanism well. In addition, in the present embodiment, when the motor of one system is stopped due the abnormality of the one system, the motors of other systems have been set to produce their outputs so that the same control range of the steerable wheels as that in the normal state is given during the vehicle traveling, and thus, no problem arises in controlling the steerable wheels during the vehicle traveling.

In an eighth aspect, the present invention resides in the vehicle steering control device in the aforementioned seventh aspect, wherein when at least one system becomes abnormal, the control means of the remaining other systems perform the control operations so that the electric motors of the remaining other systems output the same outputs as those they output in the normal state.

In this way, when at least one system becomes abnormal, the control of the respective motors by the control means of the remaining other systems is the same as is done in the normal state. Thus, the control of the motors of the remaining other systems in the normal state is not complicated, and there is attained an advantage that the control program for the motor control can be simplified.

In a ninth aspect, the present invention resides in the vehicle steering control device in any one of the aforementioned first to eighth aspects, wherein rotational displacement detection means is commonly provided for detecting the rotational displacements of the electric motors for the respective systems, and wherein the control means for each of the respective systems controls the electric motor of its own system based on a detection value detected by the rotational displacement detection means.

According to the present invention, the rotational displacement detection means is commonly provided for detecting the rotational displacements of the electric motors for the respective systems. Thus, the stress in controlling the electric current is decreased compared with that which would otherwise be caused by the detection value difference (signal difference) between respective rotational displacement detection means if the same were provided for respective systems for simultaneously detecting the detection values to drivingly control the respective motors, and thus, it can be realized to suppress noise generation and vibration which are caused by the stress in the current control.

In a tenth aspect, the present invention resides in a steering control method for a vehicle having plural systems each including an electric motor for driving a steering mechanism for steerable wheels in dependence on the rotational manipulation of a steering handle, each of the systems including the electric motor and drive means for driving the electric motor, the drive means being controlled in dependence on the rotational manipulation of the steering handle, wherein when the respective systems are normal, the electric motors of their own systems are drivingly controlled through respective drive means to drive the steering mechanism by the cooperation of the respective electric motors; and wherein when at least one system is abnormal, the electric motors of other systems are drivingly controlled through the respective drive means to drive the steering mechanism by the cooperation of the respective motors, or when at least one system is abnormal, the electric motor of the remaining system is solely drivingly controlled to drive the steering mechanism by the electric motor of the remaining system.

According to the present invention, in the normal state, the motors of the respective systems cooperate to drive the steering mechanism. As a result, it can be realized to make the output torque of each motor smaller than that in the prior art, so that the output specification of the motor can be lowered to reduce the cost therefor. This leads to reducing the cost for the steering control device provided with the respective systems.

PREFERRED EMBODIMENT TO PRACTICE THE INVENTION

Figure 1:
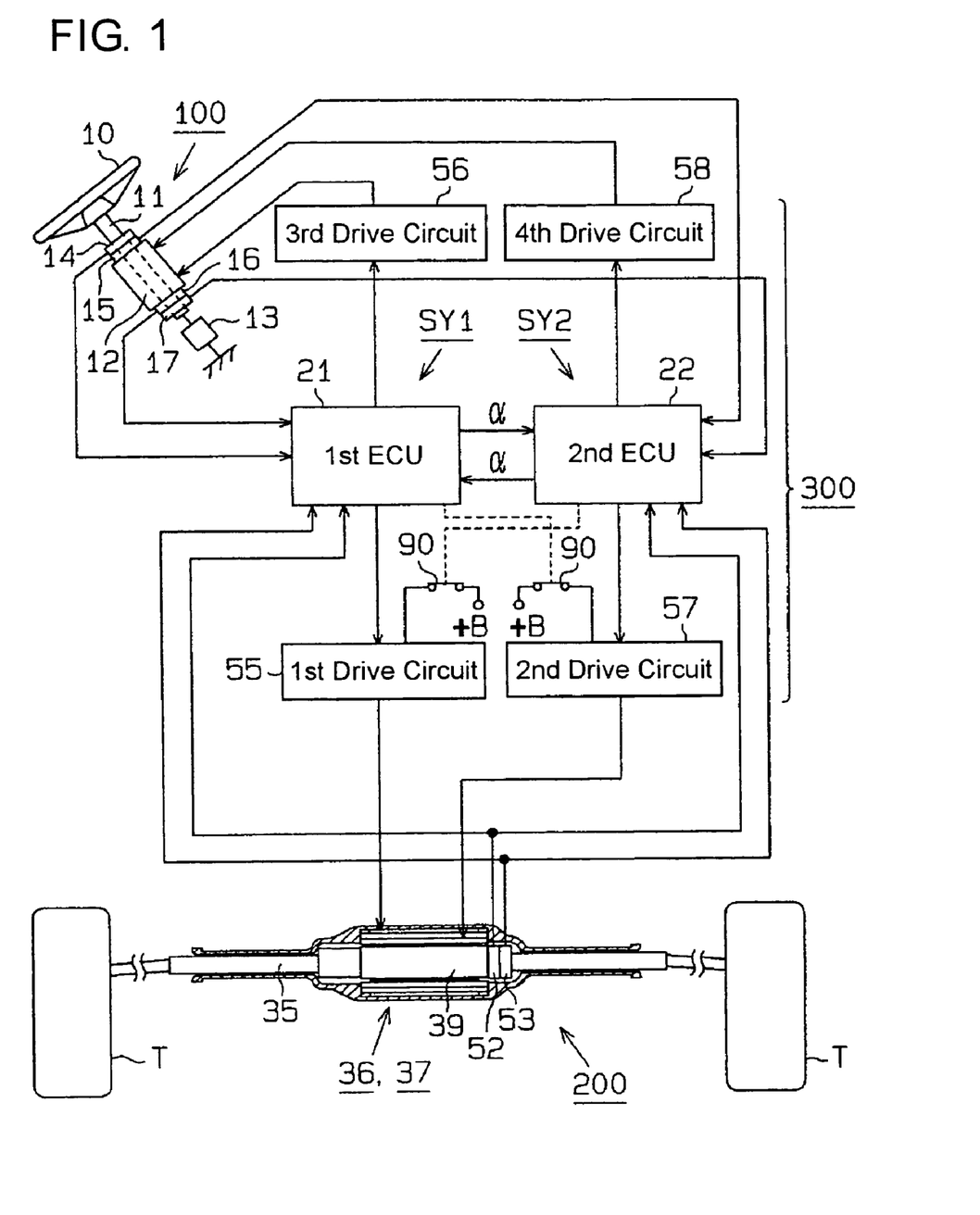
FIG. 1 is a schematic view showing the whole of a steering control device in the present embodiment.

Hereafter, one embodiment of a steering control device of the steer-by-wire type (hereafter referred simply as "steering control device") according to the present invention which is incorporated in a vehicle will be described in detail with reference to FIGS. 1 to 7. FIG. 1 shows a conceptual illustration of the steering control device in the present embodiment. The steering control device is provided with a manipulation mechanism 100 including a steering wheel 10 (steering handle), a steering mechanism 200 and a control section 300.

(Manipulation Mechanism 100)

The steering wheel 10 of the manipulation mechanism 100 is connected to a rotational shaft 11 rotatably carried on a vehicle (not shown). A reaction force exerting motor 12 is provided against the rotational shaft 11 and exerts a steering reaction force on the steering wheel 10. The reaction force exerting motor 12 is composed of a drive motor (e.g., brushless DC motor) with an output shaft thereof integral with the rotational shaft 11. An elastic mechanism 13 is coupled between an end of the rotational shaft 11 opposite to the steering wheel 10 and the vehicle (not shown). The elastic mechanism 13 is composed of, e.g., an elastic member such as spiral spring or the like. The elastic mechanism 13 is designed to return the steering wheel 10 to a neutral position (steering position for straight-ahead) when the reaction force exerting motor 12 is not exerting any torque to the steering wheel 10.

The rotational shaft 11 is provided with a first steering angle sensor 14 and a second steering angle sensor 15 for detecting the steering angle of the steering wheel 10 corresponding to the rotational angle of the rotational shaft 11. The rotational shaft 11 is also provided with a first torque sensor 16 and a second torque sensor 17 for detecting the manipulation torque being exerted on the steering wheel 10. The first steering angle sensor 14 and the first torque sensor 16 are connected to a first ECU 21. The second steering angle sensor 15 and the second torque sensor 17 are connected to a second ECU 22.

(Steering Mechanism 200)

Figure 2:
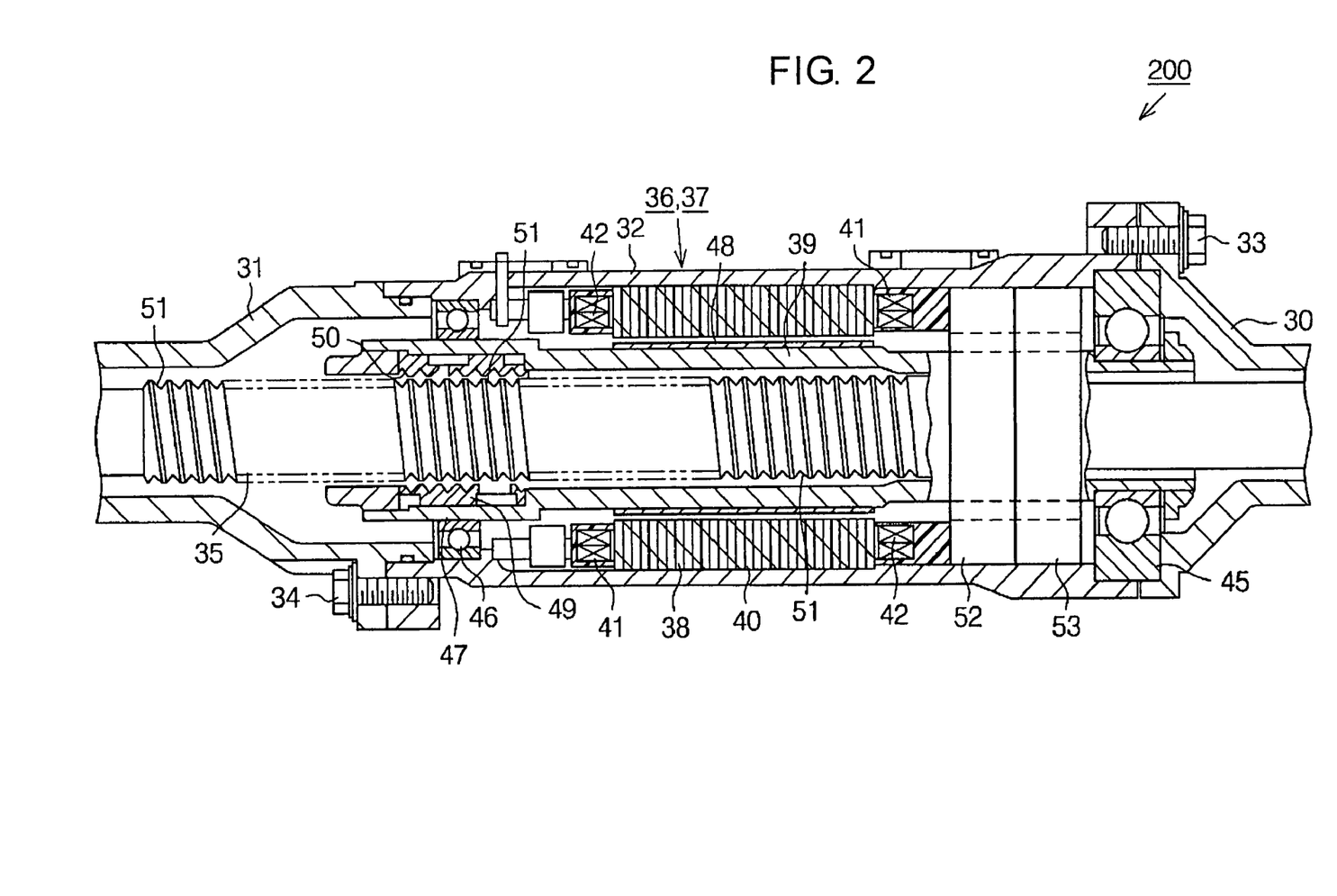
FIG. 2 is an enlarged view of an important portion of a steering mechanism 200 of the steering control device in the embodiment.

Next, the steering mechanism 200 will be described with reference to FIG. 2. FIG. 2 is an enlarged view of an important portion of the steering mechanism 200 in the steering control device. A first shaft housing 30 of hollow cylindrical shape, a second shaft housing 31 of hollow cylindrical shape, and a motor housing 32 of hollow cylindrical shape are coupled bodily in axial alignment and are supported on a body of the vehicle (not shown). More specifically, the motor housing 32 has the both shaft housings coupled thereto by means of bolts 33, 34 (shown in FIG. 2). A shaft 35 is incorporated inside of a cylindrical body which is composed of the first shaft housing 30, the second shaft housing 31 and the motor housing 32, to be non-rotatable but axially movable. The opposite ends of the shaft 35 are coupled to left and right front wheels (steerable wheels) T through tie rods (not shown), respectively. The motor housing 32 functions as a housing of the steering mechanism 200.

Figure 3:
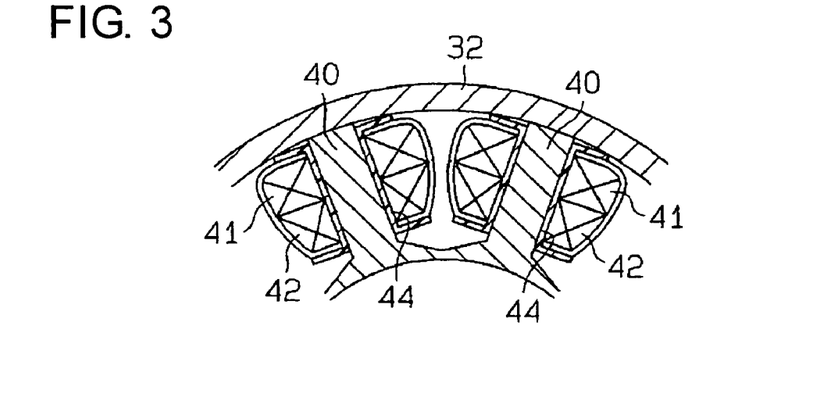
FIG. 3 is a sectional view showing the construction inside of a motor housing 32 in the embodiment.

Next, the inner construction of the motor housing 32 will be described with reference to FIG. 2 and FIG. 3. A pair of motors (electric motors) are provided within the motor housing 32. Hereafter, the motors will be called a "first motor 36" and a "second motor 37" respectively. The both motors are constituted by three-phase synchronous brushless motors. The first motor 36 and the second motor 37 have a stator 38 constituting a common stator and a motor shaft 39 constituting a common rotor. The stator 38 are provided with plural poles 40 at equiangular intervals to be fit in the internal surface of the motor housing 32. Twelve poles 40 are provided in the present embodiment. A first motor coil or winding 41 of the first motor 36 and a second motor coil or winding 42 of the second motor 37 are wound around each of these poles 40 through an isolation bobbin 44. In the present embodiment, the first motor windings 41 are arranged at the motor housing 32 side, while the second motor windings 42 are arranged at the motor shaft 39 side. (see FIG. 3) The first motor windings 41 and the second motor windings 42 are coated with isolation resin by a mold forming process.

In this embodiment, each first motor winding 41 and each second motor winding 42 are wound around the same pole 40 so that each common pole 40 wound thereby has the same phase and the same polarity, and are able to be controlled respectively by a first drive circuit 55 and a second drive circuit 57, referred to later. For example, the poles 40 which have wound therearound the first motor windings 41 serving as U-phase, V-phase and W-phase respectively, have also wound therearound the second motor windings 42 serving as U-phase, V-phase and W-phase respectively. Further, the poles 40 which have wound therearound the first motor windings 41 serving as U-bar phase, V-bar phase and W-bar phase respectively, have also wound therearound the second motor windings 42 serving as U-bar phase, V-bar phase and W-bar phase respectively. The phase with "bar" appended thereto means that it has a winding opposite in the winding direction to the phase without "bar" appended thereto so that the pole 40 of the phase with "bar" becomes opposite in polarity to that without "bar". In the description hereunder, the windings serving as U-phase and U-bar phase will be sometimes called simply "U-phase windings" unless specified to the contrary. Likewise, other phases will be sometimes called "V or W-phase windings". The windings wound around the poles 40 are arranged in the order of U1, U1-bar, V1, V1-bar, W1, W1-bar, U2, U2-bar, V2, V2-bar, W2, W2-bar in the rotational direction of the motor. The windings U1 and U2 are for U-phases having the same polarity, and the windings U1-bar and U2-bar are for U-phases having the same polarity. The same is applied to other V and W phases.

The first motor 36 and the second motor 37 are made to be of the same output power. More specifically, in the present embodiment, in order to make the output powers of the both motors equal, the first motor windings 41 and the second motor windings 42 are made to be equal in the number of windings or turns around each of the poles 40 thereof, and a first drive circuit 55 and a second drive circuit 57 are equalized in exciting current output therefrom. Thus, the first ECU 21 and the second ECU 22 operate to equalize the exciting currents output from the first drive circuit 55 and the second drive circuit 57. A composite output torque the both motors generate when simultaneously operated is set to correspond to twice as large as an output torque of each motor.

The motor shaft 39 takes a hollow cylindrical shape and is co-axially fit around the shaft 35 with a play at an intermediate portion in the axial direction of the shaft 35. The motor shaft 39 has its one end supported by the motor housing 32 and the first shaft housing 30 through a first bearing 45. The other end of the motor shaft 39 has integrally formed thereon a nut holding portion 47 of a hollow cylindrical shape which is enlarged in diameter than an intermediate portion thereof. The nut holding portion 47 is supported by the motor housing 32 and the second shaft housing 31 through a second bearing 46 to be rotatable about the axis thereof. With this construction, the motor shaft 39 is rotatably supported by the first and second shaft housings 30, 31 and the motor housing 32 through the first and second bearings 45, 46.

At the intermediate portion in the axial direction thereof facing to the stator 38, the motor shaft 39 is provided with permanent magnets 48 on the external surface thereof to be bodily rotatable therewith. Thus, when an electric current is applied to at least either ones of the first motor windings 41 and the second motor windings 42 of the stator 38, rotational force about the axis of the motor shaft 39 is generated on the motor shaft 39 with the permanent magnets 48, whereby the motor shaft 39 can be brought into rotation.

A ball screw nut 49 is coaxially fit in the nut holding portion 47 of the motor shaft 39. A spiral ball screw groove 50 is formed on the internal surface of the ball screw nut 49. A spiral ball screw groove 51 is formed on the external surface of the shaft 35 within a predetermined range in the axial direction. A plurality of balls (not shown) are retained to be rolled between the ball screw groove 51 and the ball screw groove 50. In this way, the ball screw groove 51 of the shaft 35 and the ball screw nut 49 constitute a ball screw mechanism provided with a ball screw construction. By this ball screw mechanism, the output torques in the positive and negative directions of the motor shaft 39 are converted into reciprocation movements in the axial direction of the motor shaft 35.

Between the stator 38 for the both motors and the first bearing 45, there are arranged a first rotational angle sensor 52 and a second rotational angle sensor 53 in a juxtaposed relation in the axial direction. The first rotational angle sensor 52 and the second rotational angle sensor 53 are constituted by rotary encoders. Two phase pulse train signals which are different by $\pi/2$ in phase in dependence on the rotation of the motor shaft 39 and a zero-phase pulse train signal indicative of a reference rotational position are input from the both rotational angle sensors to the first ECU 21 and the second ECU 22.

(Control Section 300)

Next, the control section 300 will be described. The first ECU 21 and the second ECU 22 are constituted by electronic control units each including a microcomputer. The first ECU 21 controls the first motor 36 and the reaction force exerting motor 12 through a first drive circuit 55 and a third drive circuit 56. Likewise, the second ECU 22 controls the second motor 37 and the reaction force exerting motor 12 through a second drive circuit 57 and a fourth drive circuit 58.

Specifically, the first ECU 21 executes a steering control for controlling the first motor 36 through the first drive circuit 55 so that a steered angle (steered angle of the steered wheels) can be obtained in correspondence to the steering angle detected by the first steering angle sensor 14 and so that for the steered angle, a necessary propelling power is given to the motor shaft 39. Therefore, the steering control by the first motor 36 involves position control for controlling the steered angle to correspond to the steering angle and torque control for generating a propelling power or output torque which is necessary to the motor shaft 39 for the position control. The first drive circuit 55 constitutes drive means. The propelling power (output torque) which is generated by the first motor 36 where the motor shaft 39 is driven by the first motor 36 only is set so that the same steered range as that in the normal state is obtained during the vehicle traveling having a small reaction force from the road surface. Where the steering is manipulated with the vehicle stopped, the reaction force from the road surface is large, and thus, the propelling power generated by the first motor 36 only is set to obtain a steering range which is narrower than that in the normal state. The first ECU 21 executes a feedback control as referred to later, for the torque control.

Further, the first ECU 21 controls the reaction force exerting motor 12 through the third drive circuit 56 so that the steering wheel 10 is given a steering reaction force corresponding to the steering angle detected by the first steering angle sensor 14.

The second ECU 22 controls the second motor 37 through the second drive circuit 57 so that a steered angle (steered angle of the steered wheels) can be obtained in correspondence to the steering angle detected by the second steering angle sensor 15. The second ECU 22 executes a steering control for controlling the second motor 37 through the second drive circuit 57 so that a steered angle (steered angle of the steered wheels) can be obtained in correspondence to the steering angle detected by the second steering angle sensor 15 and so that for the steered angle, a necessary propelling power (output torque) is given to the motor shaft 39. Therefore, the steering control by the second motor 37 involves position control for controlling the steered angle to correspond to the steering angle and torque control for generating a propelling power or output torque which is necessary to the motor shaft 39 for the position control. The second drive circuit 57 constitutes drive means. The propelling power (output torque) which is generated by the second motor 37 where the motor shaft 39 is driven by the second motor 37 only is set so that the same steered range as that in the normal state is generated during the vehicle traveling. Where the steering wheel is manipulated with the vehicle stopped, the reaction force from the road surface is large, and thus, the propelling power generated by the second motor 37 only is set to obtain a steering range which is narrower than that in the normal state. The second ECU 22 executes a feedback control as referred to later, for the torque control.

Further, the second ECU 22 controls the reaction force exerting motor 12 through the fourth drive circuit 58 so that the steering wheel 10 is given a steering reaction force corresponding to the steering angle detected by the second steering angle sensor 15.

The two phase pulse train signals and the zero-phase pulse train signal from each of the first rotational angle sensor 52 and the second rotational angle sensor 53 are input into the first ECU 21 and the second ECU 22 at a predetermined sampling frequency. Thus, the rotational position of the motor shaft 39 to the stator 38 in the first motor 36 or the second motor 37 can be judged based on the respective pulse train signals input into the first ECU 21 and the second ECU 22. While the both rotational angle sensors are normal, the first ECU 21 and the second ECU 22 utilize the input values (the respective pulse train signals) of a common rotational angle sensor. In this particular embodiment, the input values from the first rotational angle sensor 52 are used. Instead, the input values from the second rotational angle sensor 53 are used while the first rotational angle sensor 52 is abnormal.

As described above, the steering control device in the present embodiment takes the construction having the two systems. One of the systems, i.e., the first system SY1 is composed of the first ECU 21, the first steering angle sensor 14, the first torque sensor 16, the first drive circuit 55, the third drive circuit 56, the first motor 36 and the like. The other remaining system, i.e., another system (second system SY2) is composed of the second ECU 22, the second steering angle sensor 15, the second torque sensor 17, the second drive circuit 57, the fourth drive circuit 58, the second motor 37 and the like.

Figure 4:
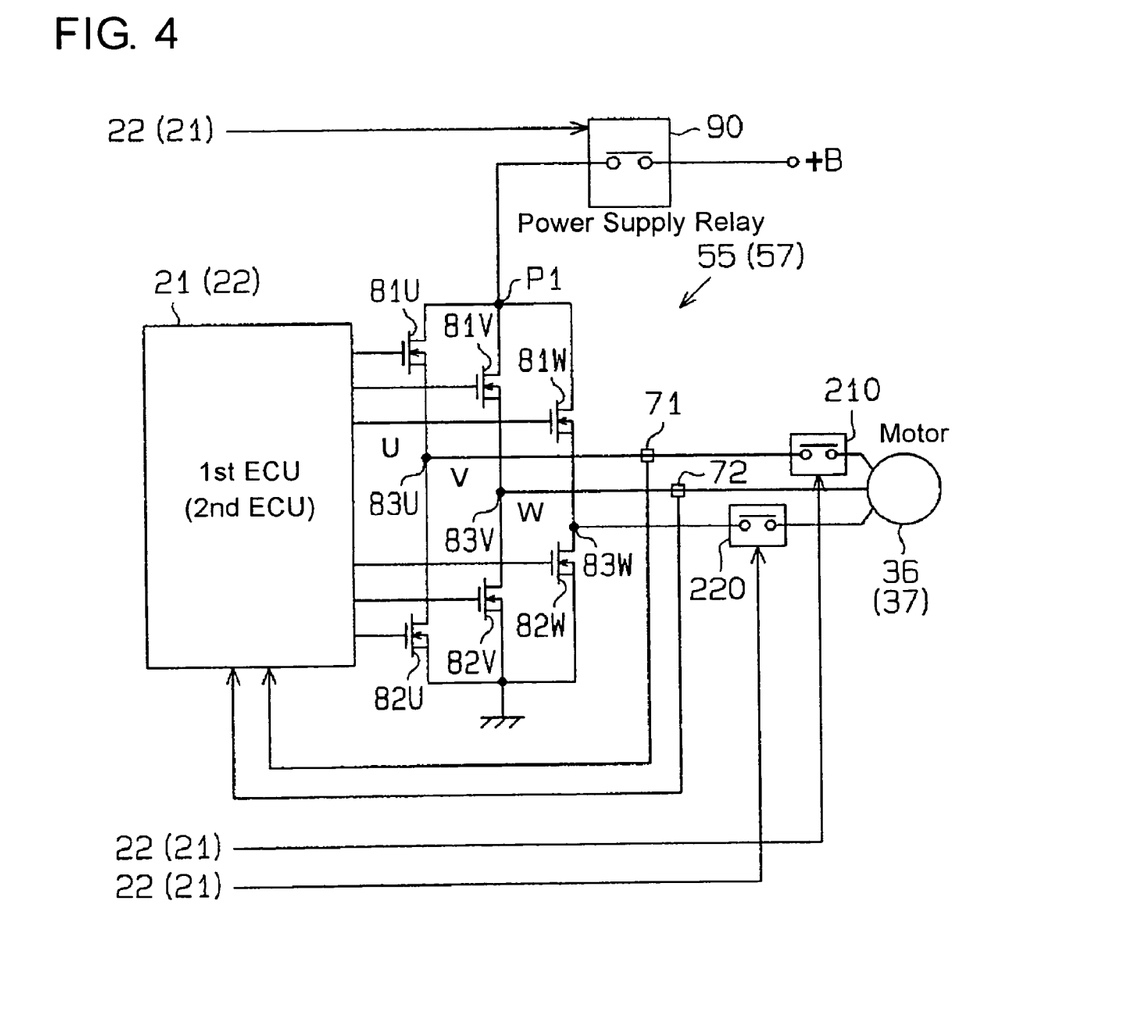
FIG. 4 is an electric circuit diagram of a first drive circuit 55 and a peripheral circuit in the embodiment.

Next, the construction of the first drive circuit 55 and the details of the peripheral circuits will be described with reference to FIG. 4. FIG. 4 is an electric circuit diagram showing the first drive circuit 55 and the peripheral circuits thereof. The second drive circuit 57 and the peripheral circuits thereof take the same constructions as those of the first drive circuit 55 and the peripheral circuits. Therefore, the description regarding the second drive circuit 57 and the peripheral circuits thereof will be omitted by putting the same reference numeral with parenthesis on the component which corresponds to that of the first drive circuit 55 and the peripheral circuits thereof. The first drive circuit 55 is constituted by connecting in parallel a series circuit of FETs 81U and 82U, another series circuit of FETs 81V and 82V and another series circuit of FETs 81W and 82W. The respective series circuits have applied thereto a voltage which is produced from a battery B or an alternator mounted on the vehicle. In FIGS. 1 and 4, the respective series circuits are shown connected to the battery B. A connection point 83U between the FETs 81U and 82U is connected to a U-phase winding of the first motor windings 41, a connection point 83 V between the FETs 81V and 82V is connected to a V-phase winding of the first motor windings 41, and a connection point 83W between the FETs 81W and 82W is connected to a W-phase winding of the first motor windings 41.

Current sensors 71, 72 are respectively arranged on two of three phase exciting current paths. The current sensors 71, 72 detect two exciting currents IU, IV of three phase exciting currents IU, IV, IW applied to the first motor 36 and output the detected exciting currents to the first ECU 21.

PWM control signals are input from the first ECU 21 to the FETs 81U and 82U, the FETs 81V and 82V and the FETs 81W and 82W. The first drive circuit 55 generates three phase exciting currents corresponding to the PWM control signals and supplies the three phase exciting currents to the first motor 36 through the three phase exciting current paths.

Next, description will be made regarding the feedback control of the first ECU 21. The first ECU 21 calculates an exciting current IW based on the two exciting currents IU, IV input thereto. Then, the first ECU 21 executes the feedback control of the first motor 36 by determining the phase exciting current for these three phases as a motor current and by calculating the difference between the motor current and a target current value. In performing the feedback control, the first ECU 21 performs PI control (proportional/integral Control) and PWM control (chopper control). The target current value is set by the first ECU 21 based on detection values from the first steering angle sensor 14 and the first rotational angle sensor 52 and the like. Then, the first ECU 21 outputs the PWM control signals obtained by the execution of the PWM control, to the first drive circuit 55. It is to be noted that the feedback control of the second ECU 22 for the second motor 37 is executed in the same manner as above in the second system SY2 to which the second ECU 22 belongs.

As shown in FIGS. 1 and 4, a power supply relay 90 is provided between the battery B (or the alternator) and an application point P1 for the series circuits. The power supply relay 90 is of the type having a normally closed contact and is brought into OFF by the control signal from the second ECU 22. Further, a phase opening relay 210 is provided between the connection point 83U of the FET 81U with the FET 82U in the first drive circuit 55 and a connection point to the U-phase winding of the first motor 36. Also, another phase opening relay 220 is provided between the connection point 83W of the FET 81W with the FET 82W in the first drive circuit 55 and a connection point to the W-phase winding of the first motor 36. The phase opening relays 210, 220 are of the type having a normally closed contact and are brought into OFF by a control signal from the second ECU 22.

The first ECU 21 and the second ECU 22 have mutual monitor functions (watchdog functions) in which through mutual communications all the time, they exchange the actual rotational positions of the first and second motors 36, 37 calculated by themselves, the detection values of the sensors included in their own systems, other information necessary for motor control and error information. For example, when the rotational positions the both ECU respectively calculate with respect to the motor shaft 39 come into coincidence, each of the ECU judges that the other ECU is normal, for the reason of the motor shaft 39 common to the systems, and if abnormal, transmits error information ($\alpha$) to the other ECU.

Thus, when one of the systems (the first system SY1 or the second system SY2 in the present embodiment) judges that the other system (the second system SY2 or the first system SY1 in the present embodiment) is abnormal, it causes the other system to discontinue the control of the reaction force exerting motor 12. In addition, the one system brings into OFF the power supply relay 90, the phase opening relay 210 and the phase opening relay 220 of the other system (the first drive circuit 55 or the third drive circuit 56). As apparent from the above, the first ECU 21 and the second ECU 22 also constitute abnormal monitor means and dynamic braking prevention means.

Operation of the Embodiment

Hereafter, description will be made regarding the operation of the steering control device as constructed above.

(In Case of Rotational Angle Sensor Being Abnormal)

Figure 5:
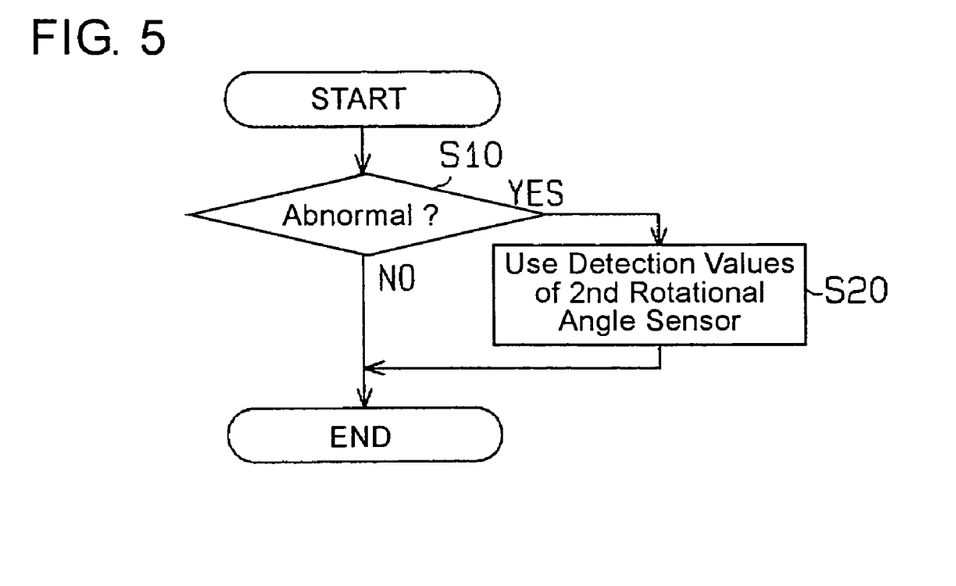
FIG. 5 is a flow chart of a rotational angle sensor abnormality monitor processing executed by a first ECU 21.

FIG. 5 is a flow chart of a rotational angle sensor abnormality monitor processing which the first ECU 21 of the first system SY1 executes for monitoring the abnormality of the first rotational angle sensor 52, and the processing is executed at a predetermined frequency. First of all, at S10 (hereafter, "S" denotes step), it is judged whether or not an input value from the first rotational angle sensor 52 having been input to the ECUs is abnormal. For example, under the condition that it is judged to be normal that the two phase pulse train signals as the input values are different by $\pi/2$ in phase from each other, the "abnormality" means either the occurrence that the phases do not differ by $\pi/2$ from each other or the occurrence that of the two phase pulse train signals, the pulse train signal for one phase does become that in the normal state.

When the input values from the first rotational angle sensor 52 are not abnormal, the flow chart is once terminated. When judging at S10 that the input values are abnormal, the first ECU 21 makes a setting to use the input values from the second rotational angle sensor 53 in the subsequent various controls and terminates the rotational angle sensor abnormality monitor processing. Therefore, when the occurrence of the abnormality is judged in the rotational angle sensor abnormality monitor processing, the first ECU 21 utilizes the input values from the second rotational angle sensor 53 and executes the positioning control and the torque control for the first motor 36 based on the input values. On the other hand, the second ECU 22 of the second system SY2 executes the rotational angle sensor abnormality monitor processing which is the same as that for the first ECU 21 shown by the flow chart in FIG. 5, at a predetermined frequency. Accordingly, when the occurrence of an abnormality is judged in the rotational angle sensor abnormality monitor processing, the second ECU uses the input values from the second rotational angle sensor 53 and executes the position control and the torque control for the second motor 37 based on the input values.

(In Case of Second System Being Abnormal)

Figure 6:
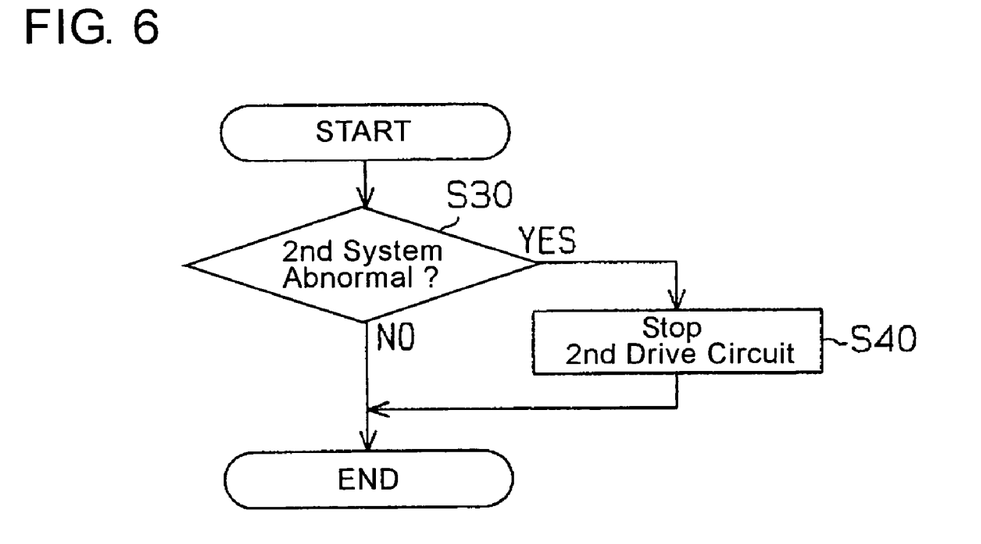
FIG. 6 is a flow chart of a second system abnormality monitor processing executed by the first ECU 21.

FIG. 6 is a flow chart of a second system abnormality monitor processing which the first ECU 21 of the first system SY1 executes for monitoring the abnormality of the second system SY2, and the processing is executed at a predetermined frequency. At S30, whether or not the second system SY2 is abnormal is judged based on the calculated actual rotational position of the second motor 37 input from the second ECU 22, the detection values of the sensors in its own system and other information necessary for motor control. The abnormality of the second system SY2 includes the abnormalities of the components constituting the second system SY2 such as, for example, the abnormalities of the sensors (second steering angle sensor 15 and second torque sensor 17), the abnormalities of the second ECU 22, the abnormalities of the second drive circuit 57 and the like. For example, the abnormalities of the second drive circuit 57 include the abnormal difference between the motor current and the target current value caused by the breaking of a wire in the second drive circuit 57. When judging at S30 that the second system SY2 is normal, the first ECU 21 once terminates the execution of this flow chart.

When judging at S30 that the second system SY2 is abnormal, the first ECU 21 causes the second drive circuit 57 to stop at S40. More specifically, the first ECU 21 brings the power supply relay 90 of the second drive circuit 57 into OFF state, brings the phase opening relays 210, 220 of the second drive circuit 57 into OFF state and transmits the error information (a) to the second ECU 22, after which it once terminates this flow chart.

When receiving the error information (a) from the first ECU 21, the second ECU 22 discontinues inputting the PWM control signals to the second drive circuit 57. The power supply relay 90 and the phase opening relays 210, 220 remain in OFF state. As a result, exciting currents are discontinued to be applied to the second motor windings 42 of the second motor 37. This results in making the propelling power (output torque) of the second motor 37 zero, and since the first motor 36 of the first system SY1 is continued to have been driven, the propelling power (output torque) of the motor shaft 39 is reduced to half. Even when the other system falls in abnormality as described above, the first ECU 21 of the remaining system controls its output torque (output power) to become equal to the output torque (output power) in the normal state.

However, during the vehicle traveling, the control of the front wheels (steerable wheels) T can be done well even when the propelling power (output torque) of the motor shaft 39 is reduced to half of the propelling power (output torque) which the motor shaft 39 produces in the normal state. Further, since the phase relays 210, 220 have been in OFF state, the second motor 37 does not generate electric energy, so that dynamic braking for weakening the propelling power of the first motor 36 does not take place.

(In Case of First System being Abnormal)

Figure 7:
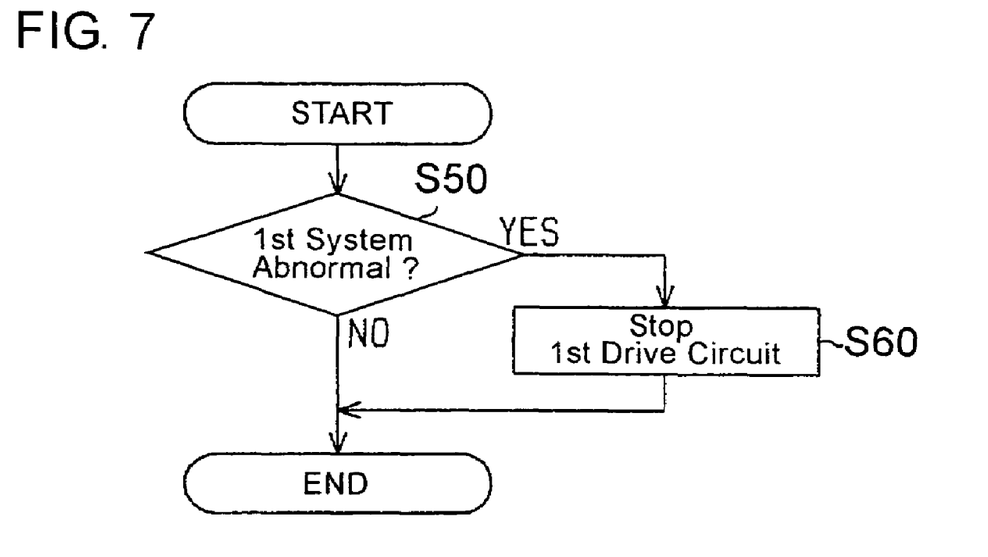
FIG. 7 is a flow chart of a first system abnormality monitor processing executed by a second ECU 22.

FIG. 7 is a flow chart of a first system abnormality monitor processing which the second ECU 22 of the second system SY2 executes for monitoring the abnormality of the first system SY1, and the processing is executed at a predetermined frequency. At S50, whether or not the first system SY1 is abnormal is judged based on the calculated actual rotational position of the first motor 36 input from the first ECU 21, the detection values of the sensors in its own system and other information necessary for motor control. The abnormality of the first system SY1 includes the abnormalities of the components constituting the first system SY1 such as, for example, the abnormalities of the sensors (first steering angle sensor 14 and first torque sensor 16), the abnormalities of the first ECU 21, the abnormalities of the first drive circuit 55 and the like. For example, the abnormalities of the first drive circuit 55 include the abnormal difference between the motor current and the target current value caused by the breaking of a wire in the first drive circuit 55. When judging at S50 that the first system SY1 is normal, the second ECU 22 once terminates the execution of this flow chart.

When judging at S50 that the first system SY1 is abnormal, the second ECU 22 causes the first drive circuit 55 to stop at S60. More specifically, the second ECU 22 brings the power supply relay 90 of the first drive circuit 55 into OFF state, brings the phase opening relays 210, 220 of the first drive circuit 55 into OFF state and transmits the error information ($\alpha$) to the first ECU 21, after which it once terminates this flow chart.

When receiving the error information ($\alpha$) from the second ECU 22, the first ECU 21 discontinues inputting the PWM control signals to the first drive circuit 55. The power supply relay 90 and the phase opening relays 210, 220 remain in OFF state. As a result, exciting currents are discontinued to be applied to the first motor windings 41 of the first motor 36. This results in making the propelling power (output torque) of the first motor 36 zero, and since the second motor 37 of the second system SY2 is continued to have been driven, the propelling power (output torque) of the motor shaft 39 is reduced to half. Even when the other system falls in abnormality as described above, the second ECU 22 of the remaining system controls its output torque (output power) to become equal to the output torque (output power) in the normal state.

However, during the vehicle traveling, the control of the front wheels (steerable wheels) T can be done well even when the propelling power (output torque) of the motor shaft 39 is reduced to half of the propelling power (output torque) which the motor shaft 39 produces in the normal state. Further, since the phase relays 210, 220 have been in OFF state, the first motor 36 does not generate electric energy, so that dynamic braking for weakening the propelling power of the second motor 37 does not take place.

The embodiment according to the present invention is not limited to the foregoing embodiment and may be modified as follows:

(1) Although in the foregoing embodiment, the systems are composed of two systems including the first system SY1 and the second system SY2, the systems may be modified to be composed of three or more systems which drivingly control plural motors including a third motor in addition to the first motor 36 and the second motor 37. In this modified case, when one system falls in abnormal state, the motors of the remaining systems are drivingly controlled, so that the steering mechanism 200 can be driven by the motors of the remaining systems. Accordingly, in the normal state, the steering mechanism 200 is driven by the composite output of the motors for all of the plural systems, and when one system is abnormal, the steering mechanism 200 is driven by the composite output torque of the motors for the remaining systems.

(2) Further, when not one system but two or more systems are abnormal in the modification in the above (1), the steering mechanism 200 may be modified to be driven by only one system if the same is the sole remaining system being not abnormal, or may be modified to be driven by the cooperation of plural systems if the same remain not to be abnormal.

(3) In the foregoing embodiment, the first motor windings 41 and the second motor windings 42 for the first motor 36 and the second motor 37 are wound around the common poles 40. Instead, the stator 38 may be provided with poles dedicated to the first motor windings 41 and other poles dedicated to the second motor windings 42, and the first motor windings 41 and the second motor windings 42 may be wound around the poles respectively dedicated thereto. As one example in case of a three-phase brushless DC motor, respective phases may be arranged as follows:

1) U, U, U-bar, U-bar, W-bar, W-bar, W, W, . . . , or
2) U, U-bar, U, U-bar, W-bar, W, W-bar, W, . . .

In this case, differently from the first embodiment, the number of the poles becomes twice as many as the first embodiment.

(4) Although in the foregoing embodiment, the first motor windings 41 and the second motor windings 42 of the first motor 36 and the second motor 37 are wound around the common poles 40, third motor windings may be further wound around the common poles 40. In other words, there may be provided a third motor and a third system for drivingly controlling the third motor. In this case, in order to make the outputs of the motors equal to one another, the first motor winding 41, the second motor winding 42 and the third motor winding are equalized in the number of windings on each of the poles 40, and the ECUs of the respective systems control the motors so that the first drive circuit 55, the second drive circuit 57 and the third drive circuit are equalized in the exciting current output therefrom. Further, when one or two systems are abnormal, the remaining two or one system which is normal is caused to drive the motor of the system. If a sufficient propelling force (output torque) is obtained during the vehicle traveling when the motor shaft 39 is driven by a sole system due to the two remaining systems being abnormal, it is unnecessary to equalize the outputs of the motors.

(5) Although in the foregoing embodiment, the first motor 36 and the second motor 37 are constituted to include the motor shaft 39 (rotor) and the stator 38 which are common thereto, they may be constituted by individual motors. For example, one of the motors is constituted in the same manner as the foregoing embodiment by providing the motor shaft 39 and the stator 38 around the shaft 35. The other motor may be constituted by providing rack teeth on the shaft 35 and by being connected to the shaft 35 through a rack-and-pinion mechanism.

(6) Although in the foregoing embodiment, the first rotational angle sensor 52 and the second rotational angle sensor 53 are constituted by rotary encoders, they may be embodied by other rotational displacement detection means such as, for example, resolvers or the like, of the kind that have predetermined electrical angles relative to the first motor 36 and the second motor 37 thereby to be able to detect the rotational displacements of the first motor 36 and the second motor 37.

(7) Although in the foregoing embodiment, the steering control device is embodied by that of the steer-by-wire type, it may be embodied by a control device for an electric power steering. For example, the shaft 35 may be constituted as a rack shaft, and a steering wheel may be connected to the rack shaft through a rack-and-pinion mechanism. Even in the modified case, the steering control device can advantageously lower the cost therefor irrespective of the provision of the plural systems.

INDUSTRIAL APPLICABILITY

The vehicle steering control device and the vehicle steering control method according to the present invention are suitable to be applied to an electric power steering device for a motor vehicle of the type that a steering mechanism is driven by electric motors in dependence on the rotation of a steering wheel to control the steerable wheels through tie rods and knuckle arms, and particularly, they are suitable to be applied to a steering device of the steer-by-wire type.

The invention claimed is:

1. A vehicle steering control device having plural systems each including an electric motor for driving a steering mechanism for steerable wheels in dependence on rotational manipulation of a steering handle, each of the systems being provided with the electric motor, drive means for driving the electric motor and control means for controlling the drive means in dependence on the rotational manipulation of the steering handle, wherein:

the control means of the respective systems include abnormality monitor means for mutually monitoring abnormalities of the systems to stop an abnormal system;

when the respective systems are normal, the control means of the respective systems drivingly control the electric motors of their own systems through the respective drive means to drive the steering mechanism in a certain steering range by cooperation of the respective electric motors; and when at least one of said plural systems is abnormal and at least another one of said plural systems is normal, the control means of the at least another one of said systems drivingly controls the electric motor of the at least another one of said systems to drive the steering mechanism in a range that, when the vehicle is stopped, is limited to be less than the certain range.

2. The vehicle steering control device as set forth in claim 1, wherein each of the control means including the abnormality monitor means is provided with dynamic braking prevention means for preventing the electric motor in an abnormal system from generating dynamic braking when the abnormality monitor means stops the abnormal system.

3. The vehicle steering control device as set forth in claim 2, wherein each of the electric motors is provided with a phase opening relay for prevention of dynamic braking and wherein the dynamic braking prevention means brings the phase opening relay of the electric motor in the abnormal system into OFF state when the abnormality monitor means stops the abnormal system.

4. The vehicle steering control device as set forth in claim 2, wherein rotational displacement detection means is commonly provided for detecting the rotational displacements of the electric motors in the respective systems and wherein the control means of the respective systems control the electric motors of their own systems based on a detection value detected by the rotational displacement detection means.

5. The vehicle steering control device as set forth in claim 1, wherein the control means of the respective systems perform control operations so that the electric motors of the respective systems output same outputs as each other when the respective systems are normal.

6. The vehicle steering control device as set forth in claim 5, wherein when at least one system becomes abnormal, the control means of the remaining other systems perform control operations so that the electric motors of the remaining other systems output same outputs as they output in the normal state.

7. A vehicle steering control device having plural systems each including an electric motor for driving a steering mechanism for steerable wheels in dependence on rotational manipulation of a steering handle, each of the systems being provided with the electric motor, drive means for driving the electric motor and control means for controlling the drive means in dependence on the rotational manipulation of the steering handle, wherein:

the control means of the respective systems include abnormality monitor means for mutually monitoring abnormalities of the systems to stop an abnormal system;

when the respective systems are normal, the control means of the respective systems drivingly control the electric motors of their own systems through the respective drive means to drive the steering mechanism by cooperation of the respective electric motors; and when at least one system is abnormal, the control means of other systems drivingly control the electric motors of their own systems through the respective drive means to drive the steering mechanism by the cooperation of the respective motors, or when at least one system is abnormal, the control means of the remaining system solely drivingly controls the electric motor of its own system through the drive means of its own system to drive the steering mechanism, wherein the electric motors of the respective systems are provided with a rotor common thereto, and wherein a stator for the electric motors of the plural systems is arranged around the rotor.

8. The vehicle steering control device as set forth in claim 7, wherein the stator is provided with a plurality of poles common to the motors and wherein windings of the electric motors for the different systems are respectively wound around the common poles.

9. The vehicle steering control device as set forth in claim 8, wherein the windings of the electric motors for the different systems arranged on each of the common poles are respectively wound to become a same phase.

10. The vehicle steering control device as set forth in claim 9, wherein each of the control means including the abnormality monitor means is provided with dynamic braking prevention means for preventing the electric motor in an abnormal system from generating dynamic braking when the abnormality monitor means stops the abnormal system.

11. The vehicle steering control device as set forth in claim 9, wherein rotational displacement detection means is commonly provided for detecting the rotational displacements of the electric motors in the respective systems and wherein the control means of the respective systems control the electric motors of their own systems based on a detection value detected by the rotational displacement detection means.

12. The vehicle steering control device as set forth in claim 8, wherein each of the control means including the abnormality monitor means is provided with dynamic braking prevention means for preventing the electric motor in an abnormal system from generating dynamic braking when the abnormality monitor means stops the abnormal system.

13. The vehicle steering control device as set forth in claim 8, wherein rotational displacement detection means is commonly provided for detecting the rotational displacements of the electric motors in the respective systems and wherein the control means of the respective systems control the electric motors of their own systems based on a detection value detected by the rotational displacement detection means.

14. The vehicle steering control device as set forth in claim 7, wherein each of the control means including the abnormality monitor means is provided with dynamic braking prevention means for preventing the electric motor in an abnormal system from generating dynamic braking when the abnormality monitor means stops the abnormal system.

15. The vehicle steering control device as set forth in claim 7, wherein rotational displacement detection means is commonly provided for detecting the rotational displacements of the electric motors in the respective systems and wherein the control means of the respective systems control the electric motors of their own systems based on a detection value detected by the rotational displacement detection means.

16. A vehicle steering control device having plural systems each including an electric motor for driving a steering mechanism for steerable wheels in dependence on rotational manipulation of a steering handle, each of the systems being provided with the electric motor, drive means for driving the electric motor and control means for controlling the drive means in dependence on the rotational manipulation of the steering handle, wherein:

the control means of the respective systems include abnormality monitor means for mutually monitoring abnormalities of the systems to stop an abnormal system;

when the respective systems are normal, the control means of the respective systems drivingly control the electric motors of their own systems through the respective drive means to drive the steering mechanism by cooperation of the respective electric motors; and when at least one system is abnormal, the control means of other systems drivingly control the electric motors of their own systems through the respective drive means to drive the steering mechanism by the cooperation of the respective motors, or when at least one system is abnormal, the control means of the remaining system solely drivingly controls the electric motor of its own system through the drive means of its own system to drive the steering mechanism, wherein rotational displacement detection means is commonly provided for detecting the rotational displacements of the electric motors in the respective systems and wherein the control means of the respective systems control the electric motors of their own systems based on a detection value detected by the rotational displacement detection means.

17. A steering control method for a vehicle having plural systems each including an electric motor for driving a steering mechanism for steerable wheels in dependence on rotational manipulation of a steering handle;

each of the systems including the electric motor and drive means for driving the electric motor, the drive means being controllable in dependence on the rotational manipulation of the steering handle; comprising:

when the respective systems are normal, drivingly controlling the electric motors of their own systems through respective drive means to drive the steering mechanism in a certain steering range by cooperation of the respective electric motors; and when at least one of said plural systems is abnormal and at least another one of said plural systems is normal, solely drivingly controlling the electric motor of the at least another one of said systems to drive the steering mechanism in a range that, when the vehicle is stopped, is limited to be less than the certain range.

* * * * *